United States Patent
Elson (10) Patent No.: US 9,244,538 B2
(45) Date of Patent: Jan. 26, 2016

(54) USING PORTABLE ELECTRONIC DEVICES FOR USER INPUT

(71) Applicant: Microsoft Corporation, Redmond, WA (US)

(72) Inventor: Jeremy Elson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 396 days.

(21) Appl. No.: 13/789,688

(22) Filed: Mar. 8, 2013

(65) Prior Publication Data

US 2014/0253443 A1   Sep. 11, 2014

(51) Int. Cl.
| | |
|---|---|
| G06F 3/0346 | (2013.01) |
| G06F 3/038 | (2013.01) |
| G06F 3/0354 | (2013.01) |

(52) U.S. Cl.
CPC .............. *G06F 3/0346* (2013.01); *G06F 3/038* (2013.01); *G06F 3/03543* (2013.01); *H04M 2250/02* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 6,104,380 | A * | 8/2000 | Stork et al. | 345/158 |
| 6,212,296 | B1 * | 4/2001 | Stork et al. | 382/188 |
| 7,870,496 | B1 | 1/2011 | Sherwani | |
| 8,065,508 | B2 | 11/2011 | Rubin et al. | |
| 2003/0117370 | A1 * | 6/2003 | Van Brocklin et al. | 345/156 |
| 2004/0236500 | A1 * | 11/2004 | Choi et al. | 701/200 |
| 2006/0182316 | A1 * | 8/2006 | Bang et al. | 382/122 |
| 2006/0187208 | A1 * | 8/2006 | Wenstrand et al. | 345/166 |
| 2007/0171202 | A1 * | 7/2007 | Yang et al. | 345/158 |
| 2008/0120448 | A1 | 5/2008 | Shi et al. | |
| 2008/0255795 | A1 * | 10/2008 | Shkolnikov | 702/141 |
| 2008/0291163 | A1 * | 11/2008 | Liberty | 345/156 |
| 2009/0298538 | A1 | 12/2009 | Gao et al. | |
| 2010/0033352 | A1 * | 2/2010 | Chuang et al. | 341/20 |
| 2010/0042358 | A1 | 2/2010 | Moussavi | |
| 2011/0001663 | A1 | 1/2011 | Anand et al. | |
| 2011/0199301 | A1 | 8/2011 | Zhao et al. | |
| 2011/0304577 | A1 * | 12/2011 | Brown et al. | 345/174 |
| 2012/0179408 | A1 * | 7/2012 | Goto et al. | 702/104 |
| 2013/0069917 | A1 * | 3/2013 | Wang et al. | 345/179 |

OTHER PUBLICATIONS

International Preliminary Report on Patentability for PCT Patent Application No. PCT/US2014/020055, Mailed Date: Feb. 9, 2015, Filed Date: Mar. 4, 2014, 11 Pages.
"International Search Report & Written Opinion for PCT Patent Application No. PCT/US2014/020055", Mailed Date: Jul. 8, 2014, Filed Date: Mar. 4, 2014, 9 Pages.

(Continued)

*Primary Examiner* — Antonio Xavier
(74) *Attorney, Agent, or Firm* — Alin Corie; Judy Yee; Micky Minhas (57) ABSTRACT

Various techniques of using a portable electronic device for user input are disclosed herein. In one embodiment, a method includes acquiring a sensor reading from an inertial measurement unit of the portable electronic device. The sensor reading contains an acceleration of the portable electronic device. The method also includes determining a position change of the portable electronic device based on the acquired sensor reading and transmitting the determined position change to a computer. The position change is usable by the computer to control a cursor position on the computer.

20 Claims, 6 Drawing Sheets

(56) References Cited

OTHER PUBLICATIONS

Smurf, Lazy, "WiFi Mouse: Utilize your Android Smartphone as a Mouse, Keyboard and Trackpad", Retrieved at <<http://www.themobimag.com/wifi-mouse-utilize-smartphone-as-mouse/>>, Retrieved Date: Feb. 28, 2013, pp. 3.

Dong, Chelsea, "SmartMouse: Turn Your Smart Phone into a Wireless Multi-touch Magic Mouse", Retrieved at <<http://technode.com/2012/09/17/smartmouse-turn-your-smart-phone-into-a-wireless-multi-touch-magic-mouse/>>, Sep. 17, 2012, pp. 3.

"DroidPad: Use Your Smartphone as Your PC Mouse or Joystick [Android]", Retrieved at <<http://www.makeuseof.com/dir/droidpad-use-smartphone-as-mouse/>>, Retrieved Date: Feb. 28, 2013, pp. 4.

Rhee, Ed, "How to Use Your Android Device as a Cordless Mouse and Keyboard", Retrieved at <<http://howto.cnet.com/8301-11310_39-20070948-285/how-to-use-your-android-device-as-a-cordless-mouse-and-keyboard/>>, Jun. 15, 2011, pp. 6.

Kiran R, et al., "Implementing Mobile Phone as a Multi-Purpose Controller using 3D Sensor Technology", Retrieved at <<http://ieeexplore.ieee.org/stamp/stamp.jsp?tp=&arnumber=5563675>>, In 3rd IEEE International Conference on Computer Science and Information Technology, Jul. 9, 2010, pp. 5.

* cited by examiner

USING PORTABLE ELECTRONIC DEVICES FOR USER INPUT

BACKGROUND

In computing, a mouse is a pointing device that allows for fine control of a graphical user interface on a computer. Computer mice, however, are external to computers and thus may lack portability. As a result, laptops, netbooks, and other portable computing devices typically do not include mice. Instead, trackpads, pointing sticks, or touchscreens have been used. Though portable, such pointing devices suffer from poor precision and inferior usability when compared to computer mice.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present technology are directed to utilizing a portable electronic device that a user already carries as a pointing device for a computer (e.g., a laptop). The portable electronic device can be a smartphone, a personal data assistant, a portable navigation device, and/or other types of electronic device. The portable electronic device can include a processor, a memory, and at least one of an accelerometer, a gyroscope, a magnetometer, or other suitable types of inertial measurement unit. The portable electronic device can be operatively coupled to the computer via a wired (e.g., a USB connection) or wireless (e.g., Bluetooth, WIFI, etc.) connection.

In operation, the inertial measurement unit can detect and measure accelerations of the portable electronic device along at least two dimensions in a coordinate system. The processor, executing instructions stored in the memory, then receives and double integrates the measured accelerations with respect to time to obtain position changes of the portable electronic device along the at least two directions. The processor can then transmit the calculated position changes to the computer via the wired or wireless connection. In response, the computer can move a computer cursor on a graphical user interface in accordance with the calculated position changes of the portable electronic device. As a result, by using the portable electronic device as a pointing device, a user can obtain fine control of the graphical user interface on the computer generally similar to using a computer mouse without carrying additional components (e.g., a computer mouse).

DETAILED DESCRIPTION

Various embodiments of systems, components, modules, routines, and processes for using portable electronic device for user input are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-5D.

As discussed above, computer mice may lack portability for using with laptops, netbooks, and other portable computing devices. Trackpads, pointing sticks, touchscreens, or other pointing devices, though portable, suffer from poor precision and inferior usability when compared to computer mice. Several embodiments of the present technology are directed to using portable electronic devices that users already carry as pointing devices. As discussed below, portable electronic devices with an inertial measurement unit can be configured to provide generally similar usability as computer mice. As a result, users can achieve fine control of graphical user interfaces on computers without carrying additional components.

As used herein, the term an "inertial measurement unit" generally refers to a measuring component configured to measure at least one of a velocity, orientation, or gravitational force of a physical mass. An inertial measurement unit can include at least one of an accelerometer, a gyroscope, a magnetometer, or other suitable types of inertial sensing element. Also used herein, the term "accelerometer" generally refers to a sensing element configured to measure a proper acceleration of a mass. A proper acceleration measured by an accelerometer is not necessarily a coordinate acceleration (i.e., a rate of change of velocity). For example, an accelerometer at rest on a surface of the Earth would measure a proper acceleration of 9.81 m/s$^2$ due to its weight. By contrast, an accelerometer in free fall would measure a proper acceleration of zero.

Figure 1:
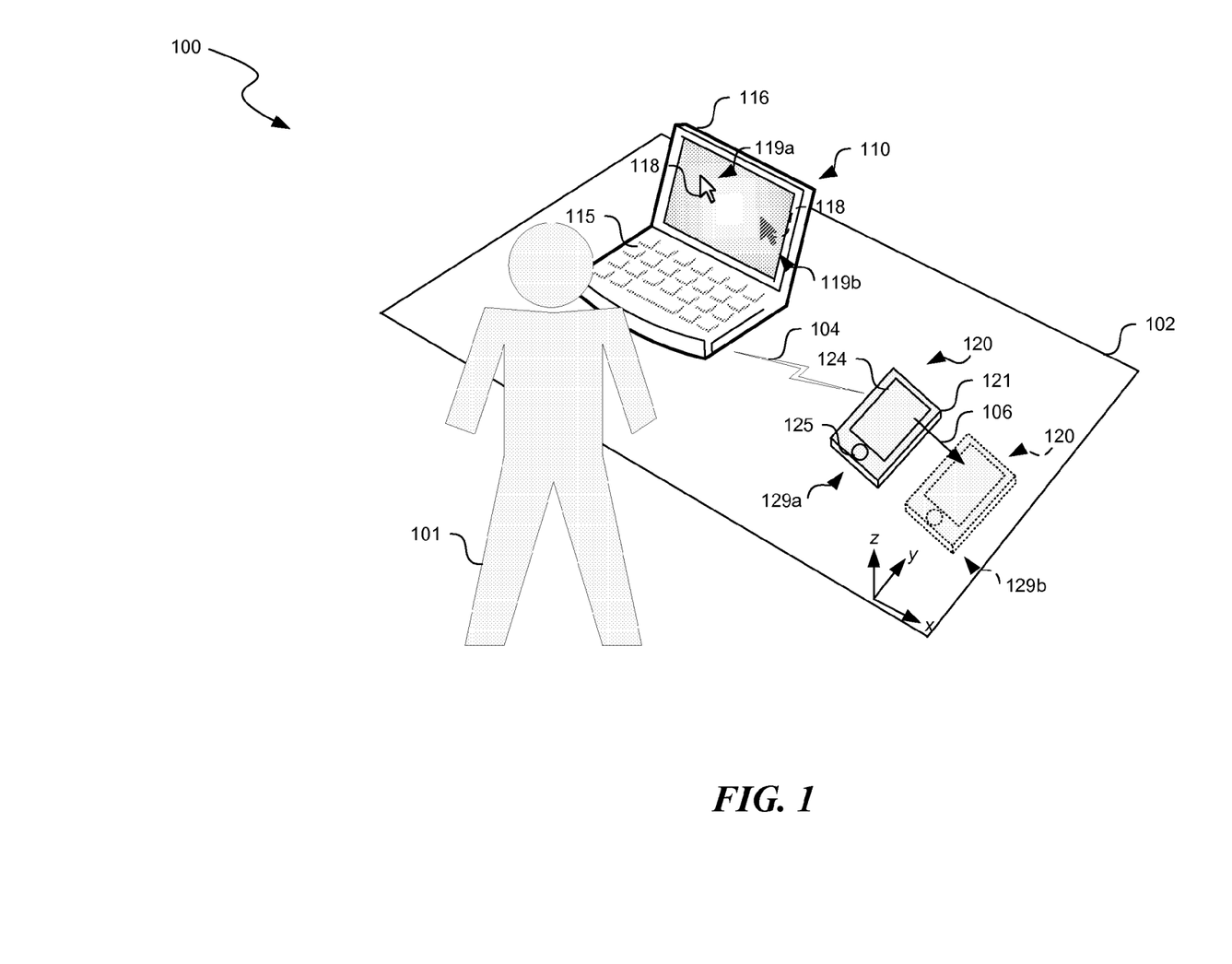
FIG. 1 is a schematic diagram illustrating a computing framework for using a portable electronic device for user input in accordance with embodiments of the present technology.

FIG. 1 is a schematic diagram illustrating a computing framework 100 for using a portable electronic device for user input in accordance with embodiments of the present technology. As shown in FIG. 1, the computer framework 100 can include a computer 110 in communication with a portable electronic device 120 via a connection 104. Both the computer 110 and the portable electronic device 120 are resting on a surface 102. The connection 104 can include a universal serial bus ("USB") link, a serial link, a parallel link, a Bluetooth link, a WIFI link, and/or other suitable wired or wireless link. In the illustrated embodiment, the computer 110 includes a laptop computer having a keyboard 115 and a display 116. In other embodiments, the computer 110 can also include a netbook, a desktop, and/or other suitable computing devices.

As shown in FIG. 1, the portable electronic device 120 includes a smartphone having a housing 121 carrying a touchscreen 124 and a button 125. In other embodiments, the portable electronic device 120 can also include a personal data assistant, a portable navigation device, or other suitable portable electronic devices. As discussed in more detail below, the portable electronic device 120 can also include a processor, a memory, and an inertial measurement unit (not shown in FIG. 1) configured to measure and track position changes of the portable electronic device 120. The portable electronic device 120 can then transmit the position changes to the computer 110 to control positions of a cursor 118 on the display 116.

In operation, a user 101 can move the portable electronic device 120 along the x-, y-, or z-axis on the surface 102. The portable electronic device 120 can then determine a position change along at least the x-, y-, or z-axis from a first position 129a to a second position 129b (shown in phantom lines for clarity), as indicated by the arrow 106. The portable electronic device 120 then transmits the determined position change as a cursor control signal or other suitable types of user input signal to the computer 110 via the connection 104. In response, the computer 110 can use the user input signal to, for example, control a cursor position on the display 116, execute computing commands, and/or perform other suitable actions based on the user input signal. For instance, as shown in FIG. 1, the computer 110 can cause the cursor 118 to traverse from a first cursor position 119a to a second cursor position 119b (shown in phantom lines for clarity) based on the position change of the portable electronic device 120. As a result, the user 101 may use the portable electronic device 120 for user input generally similarly as using a computer mouse.

Figure 2:
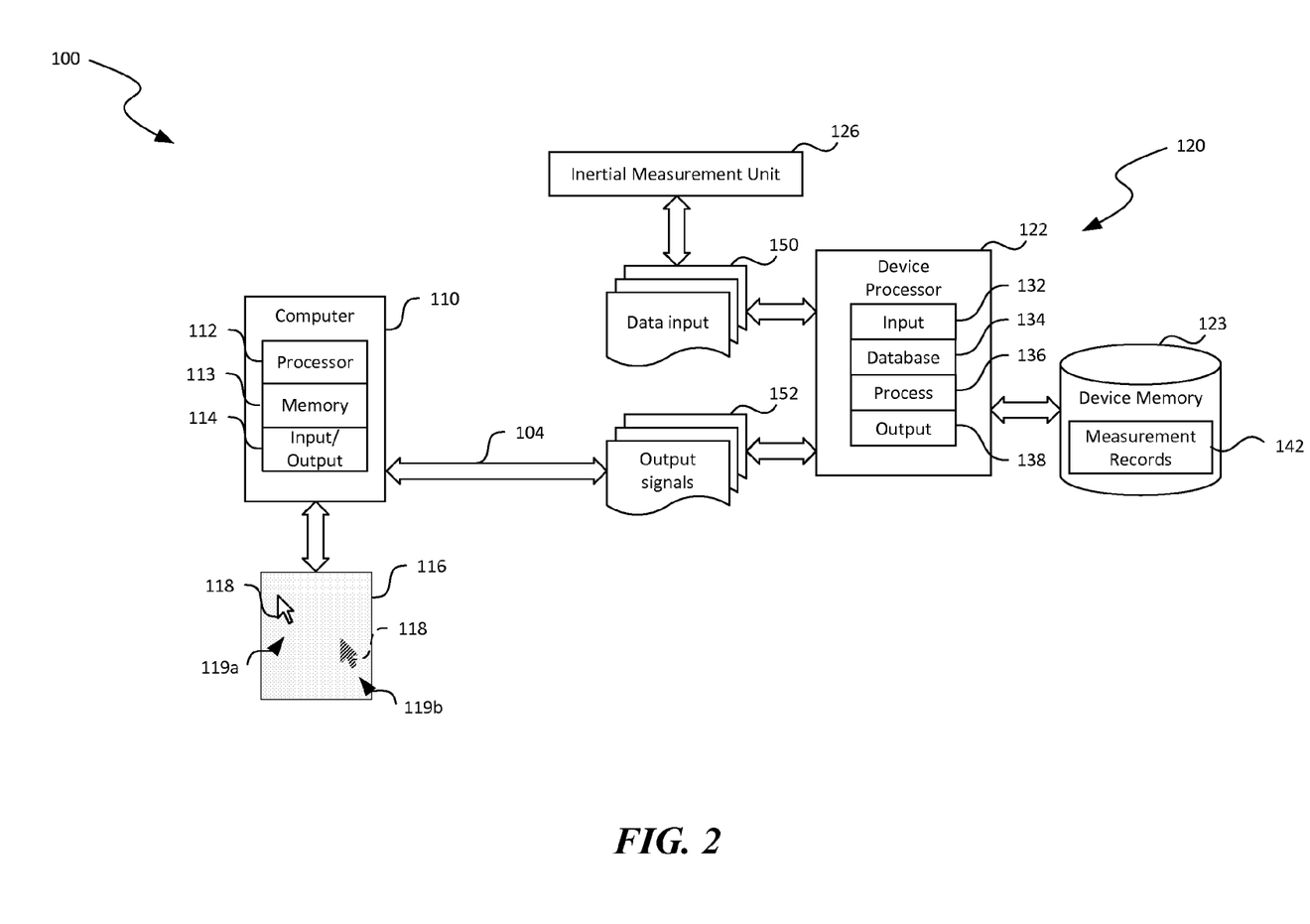
FIG. 2 is a block diagram showing computing components suitable for the computer and the portable electronic device of FIG. 1 in accordance with embodiments of the present technology.

FIG. 2 is a block diagram showing computing components suitable for the computer 110 and the portable electronic device 120 of FIG. 1 in accordance with embodiments of the present technology. In FIG. 2 and in other Figures hereinafter, individual software components, modules, and routines may be a computer program, procedure, or process written as source code in C, C++, Java, and/or other suitable programming languages. The computer program, procedure, or process may be compiled into object or machine code and presented for execution by one or more processors of a personal computer, a network server, a laptop computer, a smartphone, and/or other suitable computing devices. Various implementations of the source and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the computer 110 can include a processor 112, a memory 113, and an input/output component 114 operatively coupled to the display 116. The processor 112 can include a microprocessor, a field-programmable gate array, and/or other suitable logic devices. The memory 113 can include volatile and/or nonvolatile computer readable media (e.g., ROM; RAM, magnetic disk storage media; optical storage media; flash memory devices, EEPROM, and/or other suitable storage media) configured to store data received from, as well as instructions for, the processor 112. The input/output component 114 can include a digital and/or analog input/output interface configured to accept input from and/or provide output to the display 116 and/or other components of the computer 110.

As show in FIG. 2, the portable electronic device 120 can include a device processor 122, a device memory 123, and an inertial measurement unit 126 operatively coupled to one another. The device processor 122 can include a microprocessor and/or other suitable logic devices. The device memory 123 can include volatile and/or nonvolatile computer readable media (e.g., ROM; RAM, magnetic disk storage media; optical storage media; flash memory devices, EEPROM, and/or other suitable storage media) configured to store data received from, as well as instructions for, the device processor 122.

The inertial measurement unit 126 can include at least one of an accelerometer, a gyroscope, a magnetometer, or other suitable types of inertial sensing element. For example, in certain embodiments, the inertial measurement unit 126 can include a piezoelectric, piezo-resistive, or capacitive accelerometer. One suitable accelerometer can be a 3-axis accelerometer (Model No. LIS3DH) provided by STMicroelectronics of Geneva, Switzerland. In other embodiments, the inertial measurement unit 126 can include a pendulous integrating gyroscopic accelerometer, a surface micro-machined capacitive accelerometer, and/or other suitable types of accelerometer.

The device processor 122 can be configured to execute instructions of software components. For example, as shown in FIG. 2, software components of the device processor 122 can include an input module 132, a database module 134, a process module 136, and an output module 138 interconnected with one another. In other embodiments, the device processor 122 may execute instructions of other suitable software components in addition to or in lieu of the foregoing software modules.

In operation, the input module 132 can accept input data 150 (e.g., sensor readings from the inertial measurement unit 126), and communicates the accepted input data 150 to other components for further processing. The database module 134 organizes records, including measurement records 142, and facilitates storing and retrieving of these records to and from the device memory 123. The measurement records 142 may include contemporaneous and/or historical values of at least one of acceleration, speed, or position in at least one dimension. Any type of database organization may be utilized, including a flat file system, hierarchical database, relational database, or distributed database. The process module 136 analyzes the input data 150 from the input module 132 and/or other data sources to determine a position change of the portable electronic device 120. The output module 138 generates output signals 152 based on the analyzed input data 150 and transmits the output signals 152 as user input signals to the computer 110 via the connection 104. Embodiments of the process module 136 are described in more detail below with reference to FIG. 3.

Figure 3:
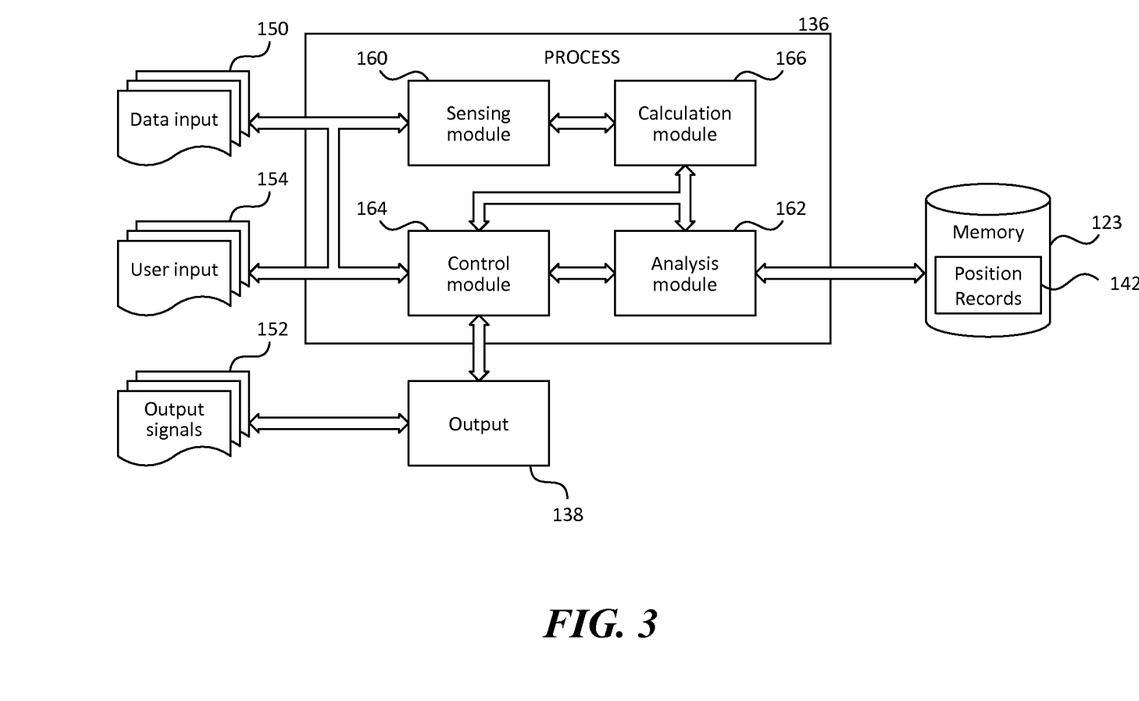
FIG. 3 is a block diagram showing software modules suitable for the portable electronic device of FIG. 2 in accordance with embodiments of the present technology.
Figure 4:
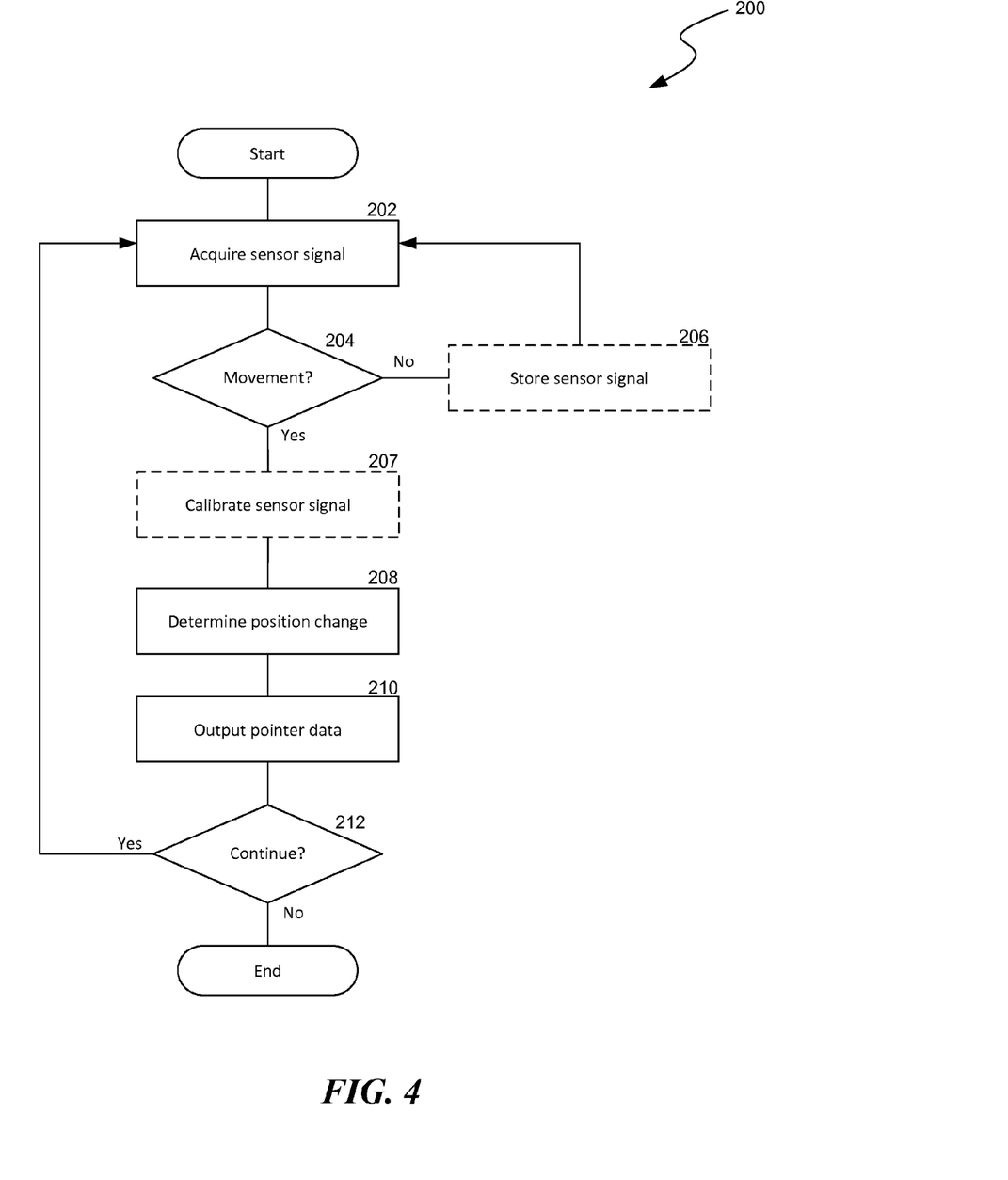
FIG. 4 is a flow diagram illustrating a process for using a portable electronic device for user input in accordance with embodiments of the present technology.

FIG. 3 is a block diagram showing embodiments of the process module 136 in FIG. 3. As shown in FIG. 4, the process module 136 may further include a sensing module 160, an analysis module 162, a control module 164, and a calculation module 166 interconnected with one other. Each module may be a computer program, procedure, or routine written as source code in a conventional programming language, or one or more modules may be hardware modules.

The sensing module 160 is configured to receive the input data 150 and converting the input data 150 into suitable metrics in engineering or other units. For example, the sensing module 160 may receive sensor readings from the inertial measurement unit 126 (FIG. 2) and convert the received sensor readings to data of an acceleration vector in meters per second squared in an Euclidean coordinate system. The acceleration vector can thus have a magnitude and a direction, which may be represented as acceleration sub-vectors in twoor three-dimensions. The sensing module 160 may sample the input from the inertial measurement unit 126 at about 30 Hz, about 60 Hz, about 120 Hz, about 1,000 Hz, or other suitable frequencies. In other examples, the acceleration vector can also be represented as acceleration sub-vectors in a cylindrical coordinate system, a spherical coordinate system, or other suitable coordinate systems. In further examples, the sensing module 160 may perform other suitable conversions.

The calculation module 166 may include routines configured to perform various types of calculations to facilitate operation of other modules. In one example, the calculation module 166 can include a subtractor routine that subtract the measured acceleration vector from gravitational acceleration, as follows:

$$\bar{a}_{net} = \bar{a} - \bar{g}$$

where $\bar{a}_{net}$ is the net acceleration vector; $\bar{a}$ is the measured acceleration vector; and $\bar{g}$ is the gravitational acceleration vector of the portable electronic device 120 (FIG. 1). In another example, the calculation module 166 can also include an integration routine that integrates the net acceleration vector $\bar{a}_{net}$ with respect to time to derive a velocity, as follows:

$$\bar{v} = \int_{t=0}^{t=\tau} \bar{a}_{net} dt$$

where $\bar{v}$ is the velocity. In yet another example, the calculation module 166 can also include a double integration routine that integrates the net acceleration vector $\bar{a}_{net}$ with respect to time to derive a position change, as follows:

$$\bar{p} = \iint_{t=0}^{t=\tau} \bar{a}_{net} dt$$

where $\bar{p}$ is a position change vector, and t is time. In yet another example, the calculation module 166 can also include a double integration routine that first integrates the net acceleration vector $\bar{a}_{net}$ with respect to time to obtain a velocity and then integrates the velocity with an exponential decay function to obtain the position change vector, as follows:

$$\bar{p} \int (\int_{t=0}^{t=\tau} \bar{a}_{net} dt) e^{-t/\tau} dt$$

where $\tau$ is a mean lifetime that may be user selected or otherwise suitably determined. In other examples, the calculation module 166 can include linear regression, polynomial regression, interpolation, extrapolation, and/or other suitable subroutines. In further examples, the calculation module 166 can also include counters, timers, and/or other suitable routines.

The analysis module 162 can be configured to analyze the various sensed and/or calculated metrics to determine if the portable electronic device 120 is moving. For example, the analysis module 162 can compare a current acceleration vector $\bar{a}$ to a previous acceleration vector $\bar{a}$, for instance stored in the device memory 123 as the position records 142. If a magnitude change of the acceleration vector $\bar{a}$ is greater than a threshold (e.g., a moving average of the magnitude or other suitable values), the analysis module 162 can indicate that the portable electronic device 120 is moving. If the magnitude change of the acceleration vector $\bar{a}$ is not greater than the threshold for a window of time (e.g., 0.5 seconds or other suitable values), the analysis module 162 can indicate that the portable electronic device 120 is stationary and can set the current acceleration vector $\bar{a}$ as a current value of the gravitational acceleration $\bar{g}$ of the portable electronic device 120. In another example, The analysis module 162 can also monitor the velocity $\bar{v}$. If the velocity has a magnitude greater than a speed threshold, the analysis module 162 can indicate that the portable electronic device 120 is moving. In other examples, the analysis module 162 can perform other suitable analysis to determine if the portable electronic device 120 is moving.

The control module 164 may be configured to control the operation of the portable electronic device 120 based on analysis results from the analysis module 162. For example, in one embodiment, if the analysis module 162 indicates that the portable electronic device 120 is moving, the control module 164 can instruct the calculation module 166 to calculate the position change vector $\bar{p}$, as discussed above. The control module 164 can then provide the calculated position change vector $\bar{p}$ to the output module 138 as the output signals 152.

In other embodiments, the control module 164 may also generate the output signals 152 based on user input 154. For example, the user 101 (FIG. 1) may provide a touch, a double touch, a scroll, a pan, and/or other suitable input to the portable electronic device 120 via the touchscreen 124. In response, the control module 164 may generate output signals 152 based on the user input 154. For example, control module 164 may interpret the user input 154 as a click, a double click, a scroll, a pan, and/or other suitable commands. In further embodiments, the control module 164 may generate the output signals 152 based on other suitable information.

Even though the portable electronic device 120 is described above as having various components and modules for determining position changes of the portable electronic device 120, in other embodiments, the computer 110 (FIG. 1) may determine such position changes. For example, the processor 112 of the computer 110 may execute instructions for at least one of the software modules 160, 162, 164, and 166. In operation, the portable electronic device 120 can transmit the data input 150 and/or other suitable information to the computer 110 via the connection 104. In response, the computer 110 can determine position changes of the portable electronic device 120, as discussed above and as discussed with reference to FIG. 4.

FIG. 4 is a flowchart showing a process 200 for using a portable electronic device for user input in accordance with embodiments of the present technology. Even though the process 200 is described below with reference to the computing framework 100 of FIG. 1 and the software components/modules of FIGS. 2 and 3, the process 200 may also be applied in other systems with additional or different hardware and/or software components.

As shown in FIG. 4, the process 200 can include acquiring a sensor signal or sensor reading at stage 202. In one embodiment, acquiring the sensor signal can include sampling the inertial measurement unit 126 (FIG. 2) to obtain data of a proper acceleration vector at 30 Hz or at other suitable sampling rates. In other embodiments, acquiring the sensor signal can also include acquiring data of at least one of an angular momentum, a pitch, a roll, or a yaw of the portable electronic device 120. In further embodiments, acquiring the sensor signal can include acquiring other suitable measurements.

The process 200 can also include determining if the portable electronic device 120 is moving at stage 204. In certain embodiments, the determination may be made with the analysis module 162 (FIG. 3) as discussed above with reference to FIG. 3. In other embodiments, the determination may be made in other suitable manners.

If the portable electronic device 120 is determined to be stationary, the process 200 can optionally include storing the acquired sensor signal at stage 206. In one embodiment, the acquired sensor signal can include an acceleration vector, and can be stored as the gravitational acceleration for the portable electronic device 120 in, for example, the device memory 123

(FIG. 2). The gravitation acceleration may or may not be normal to the Earth. For example, the gravitation acceleration may be canted relative to the surface 102 (FIG. 1) if the surface 102 is not flat. In other embodiments, other suitable sensor signals may also be stored in the device memory 123 or in other suitable locations.

If the portable electronic device 120 is determined to be moving, the process 200 can proceed to optional stage 207 to calibrate the sensor signal. In one embodiment, the sensor signal may be calibrated by retrieving the gravitational acceleration of the portable electronic device 120 from, for example, the device memory 123 and subtracting the retrieved gravitational acceleration from the acquired sensor signal. As a result, a net acceleration vector accounting for the gravitational acceleration experienced by the portable electronic device 120. In other embodiments, the calibration of the sensor signal at stage 207 may be omitted.

The process 200 can then include determining a position change of the portable electronic device 120 at stage 208. In certain embodiments, the position change may be determined as a position change vector by double integrating the net acceleration with the calculation module 166, as discussed above with reference to FIG. 3. In other embodiments, the position change may be determined by performing a first integration of the net acceleration to obtain a velocity, and a second integration of the velocity to obtain the position change vector with or without an exponential decay function. Filtering, averaging, and/or other suitable data manipulation may be performed between the first and second integration. In further embodiments, the position change may be determined in other suitable manners.

The process 200 can include outputting the determined position change as pointer data to the computer 110 (FIG. 1) via the connection 104 at stage 210. In response, the computer 110 can cause the cursor 118 to move, for example, from the first cursor position 119a to the second cursor position 119b (FIG. 1). The process 200 then includes a decision block 212 to determine whether the process continues. In one embodiment, the process 200 continues if the computer 110 is still operating. In other embodiments, the process 200 may continue based on other suitable conditions. If the process continues, the process 200 reverts to acquiring additional sensor signals at stage 202; otherwise, the process ends.

Figure 5A:
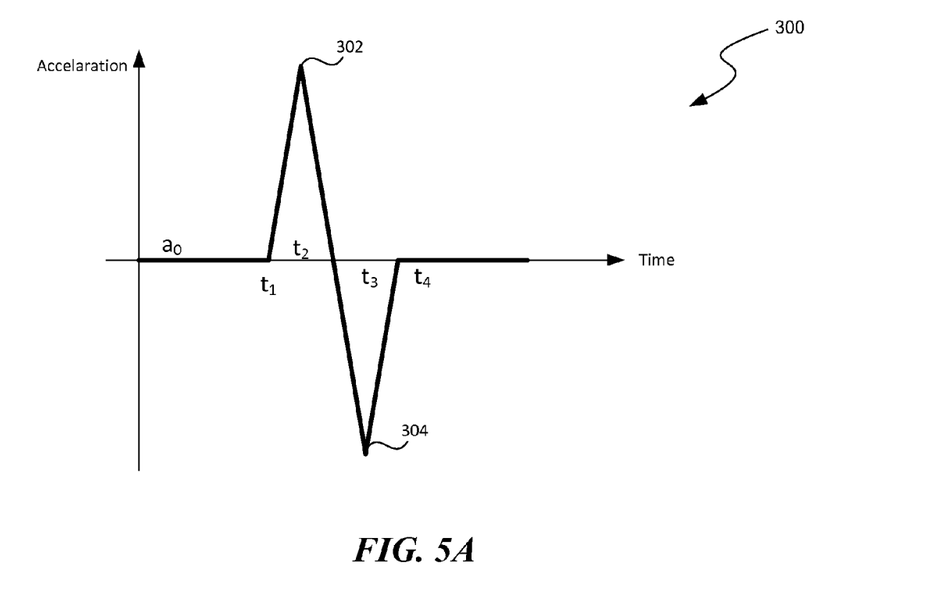
FIG. 5A is an example acceleration versus time plot in accordance with embodiments of the present technology.

FIG. 5A is an example acceleration versus time plot 300 in accordance with embodiments of the present technology. In FIGS. 5A-5D, various moving parameters (i.e., accelerations, velocities, or position changes) are shown only along one dimension for illustration purposes. In other embodiments, the portable electronic device 120 (FIG. 1) may have generally similar or different moving parameters along two or three dimensions.

As shown in FIG. 5A, the acceleration experienced by the portable electronic device 120 can have a generally constant acceleration $a_0$ before time $t_1$, at which time, the acceleration increases until a maximum acceleration 302 is reached at time $t_2$. Subsequently, the portable electronic device 120 decelerates to a negative maximum acceleration 304 at time $t_3$ before returning to the original acceleration $a_0$ at $t_4$.

Figure 5B:
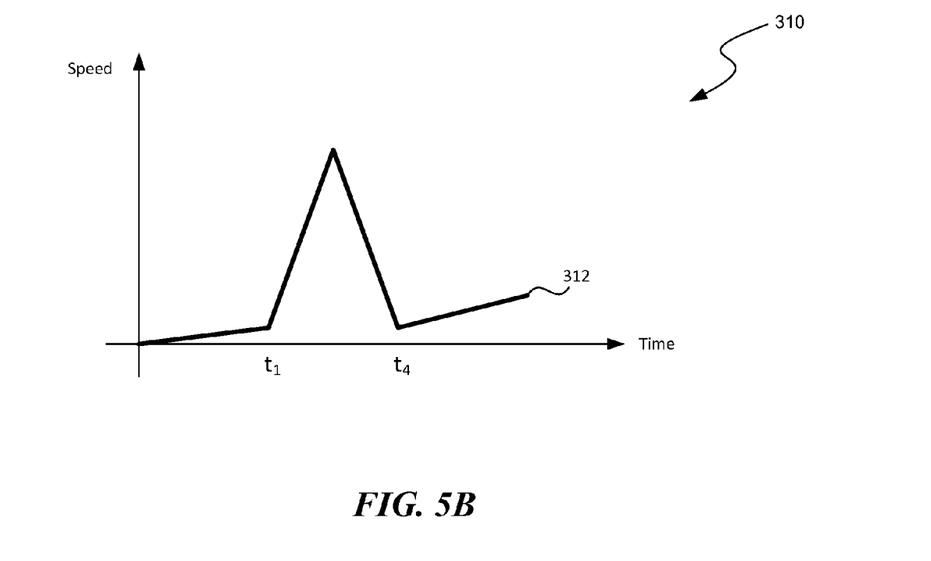
FIGS. 5B and 5C are example original and corrected speed versus time plots obtained based on the acceleration versus time plot of FIG. 5A, respectively.

FIG. 5B is an example speed versus time plot 310 obtained (e.g., by integrating with respect to time) based on the acceleration versus time plot of FIG. 5A without calibration. As shown in FIG. 5B, it is believed that a non-flat surface 102 (FIG. 1) on which the portable electronic device rests may cause the obtained velocity to have non-zero values 312 before time $t_1$ and after time $t_4$, when the portable electronic device 120 is stationary.

Figure 5C:
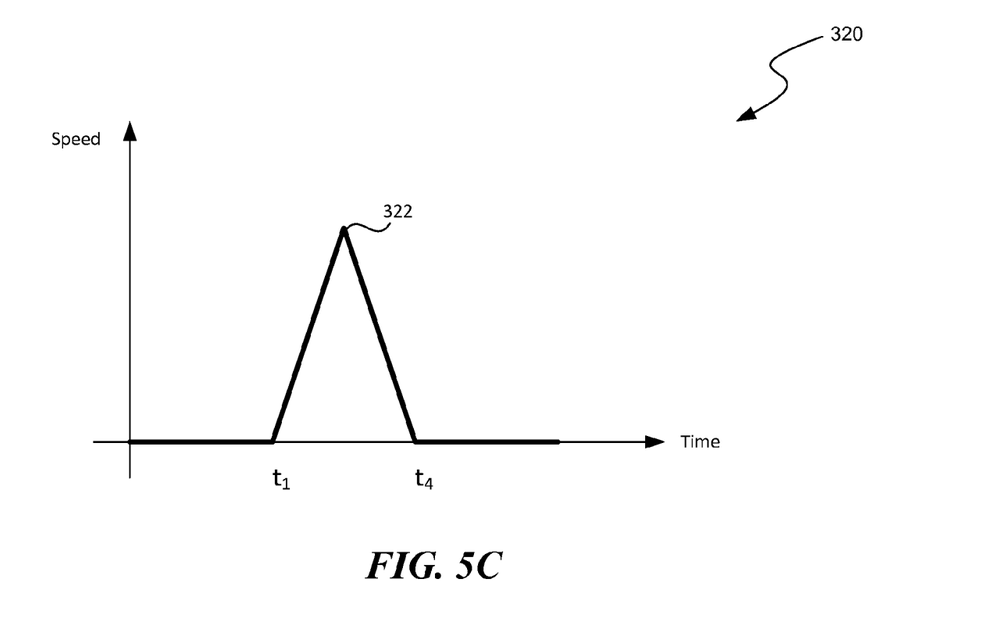

To correct for such an error, the acceleration as shown in FIG. 5A may be calibrated by subtracting the gravitational acceleration experienced by the portable electronic device 120, as discussed above with reference to FIG. 4. FIG. 5C is an example speed versus time plot 320 obtained based on the acceleration versus time plot of FIG. 5A with calibration. As shown in FIG. 5C, the velocity increases at time $t_1$ and decreases before reaching a maximum velocity 322. Subsequently, the velocity decreases to zero at time $t_4$.

Figure 5D:
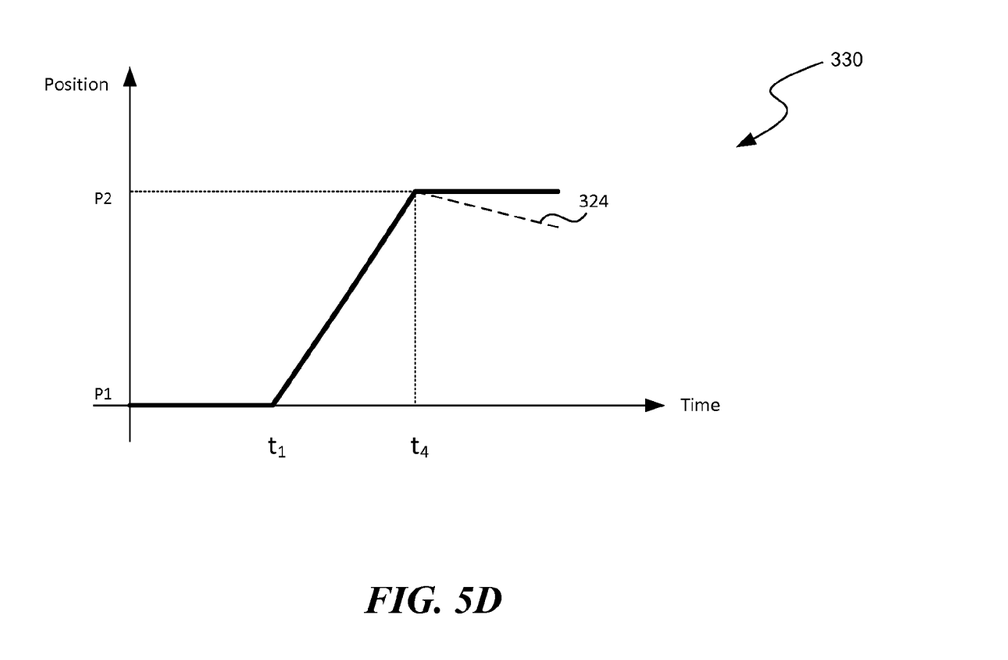
FIG. 5D is an example position versus time plot based on the corrected speed versus time plot of FIG. 5C.

FIG. 5D is an example position versus time plot 330 based on the corrected speed versus time plot of FIG. 5C. As shown in FIG. 5D, the position of the portable electronic device 120 changes from P1 to P2 over $t_1$ to $t_4$. The inventor has recognized that data noises in the acceleration as shown in FIG. 5A may cause the position at P2 to be non-constant, as shown by the dashed line 324. In certain embodiments, such an error may be corrected by double integrating the acceleration with an exponential decay function, as discussed above with reference to FIG. 3. In other embodiments, such an error may be corrected by setting the position at $t_4$ to be constant. In further embodiments, other suitable techniques may also be used to correct such an error.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A method performed by a processor of a portable electronic device having an inertial measurement unit, the method comprising:
   with the processor,
      acquiring a sensor reading from the inertial measurement unit, the sensor reading containing data of an acceleration of the portable electronic device;
      determining a position change of the portable electronic device based on the acquired sensor reading, wherein determining the position change includes integrating the data of the acceleration to obtain a velocity and subsequently integrating the obtained velocity with an exponential decay function to obtain the position change vector; and
      transmitting the determined position change as a user input signal to a computer, the user input signal being used by the computer to control a cursor position on a display of the computer.

2. The method of claim 1 wherein:
   the inertial measurement unit includes an accelerometer; and
   acquiring the sensor reading includes acquiring the sensor reading from the accelerometer, the sensor reading containing data of an acceleration vector in two or three dimensions.

3. The method of claim 1 wherein:
   the inertial measurement unit includes an accelerometer;
   acquiring the sensor reading includes acquiring the sensor reading from the accelerometer, the sensor reading containing data of an acceleration vector in two or three dimensions; and
   determining the position change includes integrating the acceleration vector in two or three dimensions of the sensor reading to obtain the velocity and subsequently integrating the obtained velocity with the exponential decay function to obtain the position change vector in two or three dimensions.

4. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions; and
the method further includes calibrating the sensor reading based on a current value of gravitational acceleration of the portable electronic device.

5. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions;
the method further includes calibrating the sensor reading based on a current value of gravitational acceleration of the portable electronic device to obtain a net acceleration.

6. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions;
the method further includes calibrating the sensor reading based on a current value of gravitational acceleration of the portable electronic device to obtain a net acceleration; and
determining the position change includes integrating the net acceleration to obtain the velocity and subsequently integrating the obtained velocity with the exponential decay function to obtain the position change vector.

7. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions; and
the method further includes
determining whether the portable electronic device is moving; and
in response to determining that the portable electronic device is moving, calibrating the sensor reading based on a current value of gravitational acceleration of the portable electronic device.

8. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions; and
the method further includes
determining whether the portable electronic device is moving;
in response to determining that the portable electronic device is moving, calibrating the sensor reading based on a current value of gravitational acceleration of the portable electronic device; and
in response to determining that the portable electronic device is not moving, storing the sensor reading as the current value of gravitational acceleration of the portable electronic device.

9. The method of claim 1 wherein:
the inertial measurement unit includes an accelerometer;
acquiring the sensor reading includes acquiring the sensor reading from the accelerometer, the sensor reading containing data of a proper acceleration vector in two or three dimensions;
the method further includes:
comparing the proper acceleration vector with a previous proper acceleration vector of the portable electronic device; and
in response to that a difference between the proper acceleration vector and the previous proper acceleration is above a threshold, indicating that the portable electronic device is moving.

10. A portable electronic device having a processor, a memory, and an inertial measurement unit, the memory containing instructions, when executed by the processor, causing the processor to perform a process comprising:
acquiring a sensor reading from the inertial measurement unit, the sensor reading containing data of an acceleration vector of the portable electronic device;
calculating a position change of the portable electronic device based on the data of acceleration vector contained in the acquired sensor reading, wherein calculating the position change includes integrating the data of the acceleration vector to obtain a velocity and subsequently integrating the obtained velocity with an exponential decay function to obtain the position change vector; and
transmitting the calculated position change as a cursor control signal to a computer to enable the computer to control a cursor position on a display of the computer based on the calculated position change of the portable electronic device.

11. The portable electronic device of claim 10 wherein:
the inertial measurement unit includes an accelerometer;
acquiring the sensor reading includes acquiring the sensor reading from the accelerometer, the sensor reading containing data of the acceleration vector in two or three dimensions; and
transmitting the calculated position change to the computer includes transmitting the calculated position change to the computer to enable the computer to control the cursor position on the computer in two or three dimensions based on the calculated position change of the portable electronic device.

12. The portable electronic device of claim 10 wherein:
the inertial measurement unit includes an accelerometer;
acquiring the sensor reading includes acquiring the sensor reading from the accelerometer, the sensor reading containing data of the acceleration vector in two or three dimensions; and
calculating the position change includes integrating the data of the acceleration vector in two or three dimensions of the sensor reading to obtain the velocity and subsequently integrating the obtained velocity with the exponential decay function to obtain the position change vector.

13. The portable electronic device of claim 10 wherein:
the inertial measurement unit includes an accelerometer;
acquiring the sensor reading includes acquiring the sensor reading from the accelerometer, the sensor reading containing data of a proper acceleration vector in two or three dimensions; and
the process further includes calibrating the sensor reading based on a current value of gravitational acceleration of the portable electronic device.

14. The portable electronic device of claim 10 wherein the inertial measurement unit includes an accelerometer;
acquiring the sensor reading includes acquiring the sensor reading from the accelerometer, the sensor reading containing data of a proper acceleration vector in two or three dimensions;
the process further includes calibrating the sensor reading based on a current value of gravitational acceleration of the portable electronic device to obtain a net acceleration.

15. The portable electronic device of claim 10 wherein:
the inertial measurement unit includes an accelerometer;
acquiring the sensor reading includes acquiring the sensor reading from the accelerometer, the sensor reading containing data of a proper acceleration vector in two or three dimensions;
the process further includes calibrating the sensor reading based on a current value of gravitational acceleration of the portable electronic device to obtain a net acceleration; and
calculating the position change includes integrating the net acceleration to obtain the velocity and subsequently integrating the obtained velocity with the exponential decay function to obtain the position change vector.

16. The portable electronic device of claim 10 wherein:
the inertial measurement unit includes an accelerometer;
acquiring the sensor reading includes acquiring the sensor reading from the accelerometer, the sensor reading containing data of a proper acceleration vector in two or three dimensions; and
the process further includes
determining whether the portable electronic device is moving; and
in response to determining that the portable electronic device is moving, calibrating the sensor reading based on a current value of gravitational acceleration of the portable electronic device.

17. A portable electronic device having a processor, a memory, and an accelerometer, the processor comprising:
a sensing module configured to acquire a sensor reading from the accelerometer, the sensor reading containing data of an acceleration vector of the portable electronic device;
a calculation module configured to calculate a position change of the portable electronic device by integrating the acceleration vector with respect to time to obtain a velocity and subsequently integrating the obtained velocity with an exponential decay function to obtain the position change; and
a control module configured to generate output signals based on the calculated position change to be transmitted to a computer to enable the computer to control a cursor position on a display of the computer based on the calculated position change of the portable electronic device.

18. The portable electronic device of claim 17 wherein the processor further includes:
an analysis module configured to determine whether the portable electronic device is moving by monitoring the acceleration vector for a window of time, wherein in response to determining that the monitored acceleration vector remains generally constant, indicating the portable electronic device is not moving and storing the monitored acceleration vector as a current value of the gravitational acceleration; and
wherein in response to determining that the portable electronic device is moving, the calculating module is also configured to calibrate the sensor reading by subtracting the current value of gravitational acceleration of the portable electronic device from the acceleration vector contained in the sensor reading.

19. The portable electronic device of claim 17 wherein the processor further includes:
an analysis module configured to determine whether the portable electronic device is moving by monitoring the acceleration vector for a window of time, wherein in response to determining that the monitored acceleration vector remains generally constant, indicating the portable electronic device is not moving and storing the monitored acceleration vector as a current value of the gravitational acceleration; and
wherein in response to determining that the portable electronic device is moving, the calculating module is also configured to calibrate the sensor reading by subtracting the current value of gravitational acceleration of the portable electronic device from the acceleration vector contained in the sensor reading.

20. The portable electronic device of claim 17 wherein the processor further includes:
an analysis module configured to determine whether the portable electronic device is moving by monitoring the acceleration vector for a window of time, wherein in response to determining that the monitored acceleration vector remains generally constant, indicating the portable electronic device is not moving and storing the monitored acceleration vector as a current value of the gravitational acceleration; and
wherein in response to determining that the portable electronic device is moving, the calculating module is also configured to calibrate the sensor reading by subtracting the current value of gravitational acceleration of the portable electronic device from the acceleration vector contained in the sensor reading; and
wherein the calculation module is configured to calculate the position change of the portable electronic device by integrating the calibrated sensor reading with respect to time to obtain the velocity and subsequently integrating the obtained velocity with the exponential decay function to obtain the position change.

* * * * *